(12) United States Patent
Yanko et al.

(10) Patent No.: US 9,436,856 B2
(45) Date of Patent: Sep. 6, 2016

(54) MAGNETIC STRIPE CARD READER

(71) Applicant: VERIFONE INC., San Jose, CA (US)

(72) Inventors: Igal Yosef Yanko, Carmichael, CA (US); Erik Neil Larson, Carlsbad, CA (US); Pao-Ling Chen, New Taipei (TW)

(73) Assignee: VERIFONE, INC., San Jose, CA (US)

( * ) Notice: Subject to any disclaimer, the term of this patent is extended or adjusted under 35 U.S.C. 154(b) by 0 days.

(21) Appl. No.: 14/580,995

(22) Filed: Dec. 23, 2014

(65) Prior Publication Data
US 2016/0180119 A1 Jun. 23, 2016

(51) Int. Cl.
*G06K 7/08* (2006.01)

(52) U.S. Cl.
CPC ..................... *G06K 7/084* (2013.01)

(58) Field of Classification Search
CPC .......... G06K 5/00; G06K 7/08; G06K 19/00; G06K 19/06; G06K 7/00
USPC .......... 235/449, 439, 435, 493, 487
See application file for complete search history.

(56) References Cited

U.S. PATENT DOCUMENTS

| | | |
|---|---|---|
| 3,949,193 A | 4/1976 | Dowdell |
| 4,028,734 A | 6/1977 | Mos |
| 4,184,179 A | 1/1980 | Deming |
| 4,538,191 A | 8/1985 | Suzuki et al. |
| 4,631,610 A | 12/1986 | Kobayashi et al. |
| 5,196,680 A | 3/1993 | Schuder |
| 5,270,523 A | 12/1993 | Chang et al. |
| 5,945,654 A | 8/1999 | Huang |
| 5,984,184 A * | 11/1999 | Kojima ................ G06K 7/0021 235/441 |
| 6,042,010 A * | 3/2000 | Kanayama et al. .......... 235/449 |
| 6,250,552 B1 | 6/2001 | Hirasawa |
| 6,342,982 B1 | 1/2002 | Kanayama et al. |
| 6,585,156 B2 | 7/2003 | Takita |
| 6,601,765 B2 | 8/2003 | Yuan |
| 6,817,524 B2 | 11/2004 | Hilton et al. |
| 6,866,201 B2 | 3/2005 | Abe et al. |
| 6,927,928 B2 | 8/2005 | Nakabo et al. |
| 7,347,370 B2 | 3/2008 | McJones |
| 7,753,275 B2 | 7/2010 | Schulz |
| 2004/0104722 A1* | 6/2004 | Kainuma et al. .............. 324/210 |
| 2006/0176065 A1* | 8/2006 | Koch et al. ................... 324/754 |

(Continued)

FOREIGN PATENT DOCUMENTS

| | | |
|---|---|---|
| JP | 2281464 | 11/1990 |
| JP | 4060910 | 2/1992 |
| JP | 10083529 A * | 3/1998 |

OTHER PUBLICATIONS

Notice of Allowance dated Mar. 8, 2010, which issued during the prosecution of U.S. Appl. No. 11/856,460.

(Continued)

*Primary Examiner* — Edwyn Labaze
(74) *Attorney, Agent, or Firm* — Sughrue Mion, PLLC

(57) ABSTRACT

A magnetic stripe card reader including a magnetic stripe reader head support base having an aperture communicating with a card swipe slot, a magnetic stripe reader head, a magnetic stripe reader head bracket supporting the magnetic stripe reader head at least partially in the aperture and a pair of coil springs associated with the magnetic strip reader head bracket and the magnetic stripe reader head support base and arranged such that resilient axial retraction of the magnetic stripe reader head in the aperture is permitted with respect to the card swipe slot.

7 Claims, 3 Drawing Sheets

(56) References Cited

U.S. PATENT DOCUMENTS

| | | | |
|---|---|---|---|
| 2009/0072033 A1* | 3/2009 | Schulz | 235/449 |
| 2011/0006118 A1* | 1/2011 | Mizawa | G06K 13/0875 235/483 |
| 2011/0278359 A1* | 11/2011 | Kasai et al. | 235/449 |
| 2014/0021255 A1* | 1/2014 | Lo et al. | 235/449 |

OTHER PUBLICATIONS

An Office Action dated Oct. 5, 2009, which issued during the prosecution of U.S. Appl. No. 11/856,460.

* cited by examiner

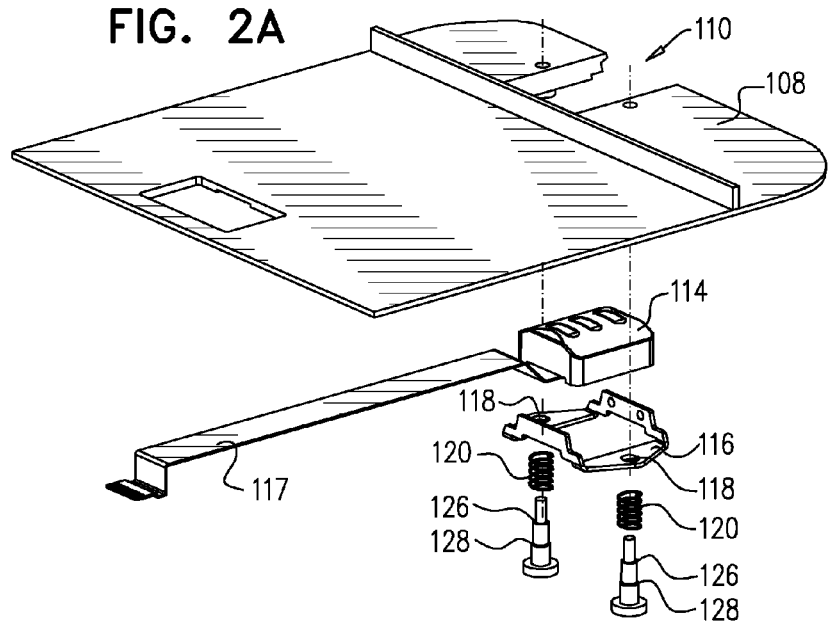
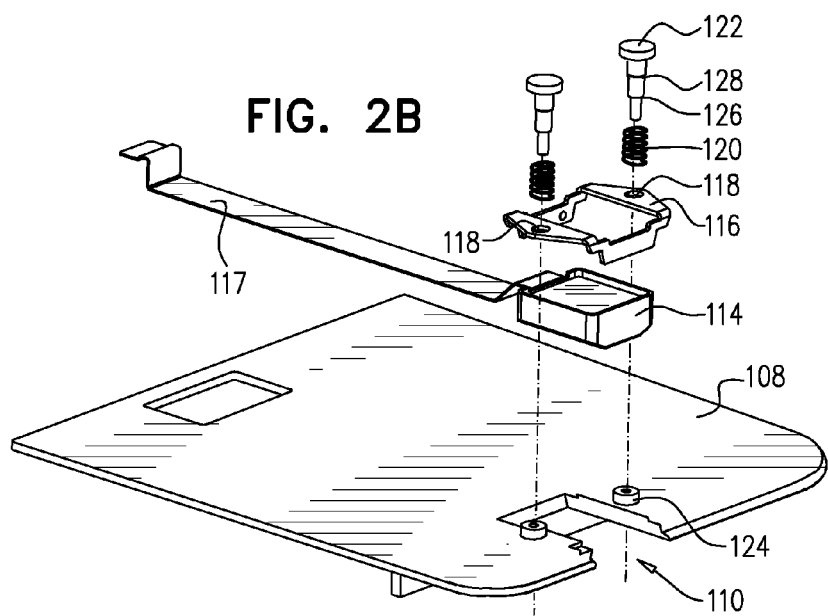

MAGNETIC STRIPE CARD READER

FIELD OF THE INVENTION

The present invention relates generally to magnetic stripe card readers.

BACKGROUND OF THE INVENTION

Various types of magnetic stripe card readers are known.

SUMMARY OF THE INVENTION

The present invention seeks to provide an improved magnetic stripe card reader.

There is thus provided in accordance with a preferred embodiment of the present invention a magnetic stripe card reader including a magnetic stripe reader head support base having an aperture communicating with a card swipe slot, a magnetic stripe reader head, a magnetic stripe reader head bracket supporting the magnetic stripe reader head at least partially in the aperture and a pair of coil springs associated with the magnetic strip reader head bracket and the magnetic stripe reader head support base and arranged such that resilient axial retraction of the magnetic stripe reader head in the aperture is permitted with respect to the card swipe slot.

Preferably, the magnetic stripe reader head bracket is formed with a pair of mutually spaced mounting apertures and a pair of elongate fasteners extend respectively through the pair of coil springs and through the pair of mutually spaced mounting apertures into fixed engagement with the magnetic stripe reader head support base.

In accordance with a preferred embodiment each of the pair of elongate fasteners is formed with a shoulder which limits an extent that the fasteners extend beyond the magnetic stripe reader head support base.

Alternatively, each of the pair of elongate fasteners is formed with a shoulder which limits retraction travel of the magnetic stripe reader head bracket and thus of the magnetic strip reader head relative to the pair of fasteners and thus relative to the card swipe slot and the aperture. Additionally, the pair of mutually spaced mounting apertures are sufficiently small as not to be able to pass the shoulders, whereby the shoulders define stops for limiting retraction displacement of the magnetic stripe reader head bracket against urging of the coil springs.

In accordance with a preferred embodiment of the present invention each of the pair of elongate fasteners is formed with a first shoulder, which limits an extent that the fasteners extend beyond the magnetic stripe reader head support base, and a second shoulder, which limits retraction travel of the magnetic stripe reader head bracket and thus of the magnetic strip reader head relative to the pair of fasteners and thus relative to the card swipe slot and the aperture. Additionally, the pair of mutually spaced mounting apertures are sufficiently small as not to be able to pass the second shoulders, whereby the second shoulders define stops for limiting retraction displacement of the magnetic stripe reader head bracket against urging of the coil springs.

Preferably, the magnetic stripe card reader also includes a pair of fastener head engagement sockets for engaging heads of the pair of fasteners for retaining them in desired fixed engagement with the magnetic stripe reader head support base.

BRIEF DESCRIPTION OF THE DRAWINGS

The present invention will be understood and appreciated more fully from the following detailed description, taken in conjunction with the drawings, in which:

FIGS. 2A and 2B are respective upward-facing and downward-facing exploded view illustrations of parts of the card reader of FIG. 1.

DETAILED DESCRIPTION OF PREFERRED EMBODIMENTS

Figure 1:
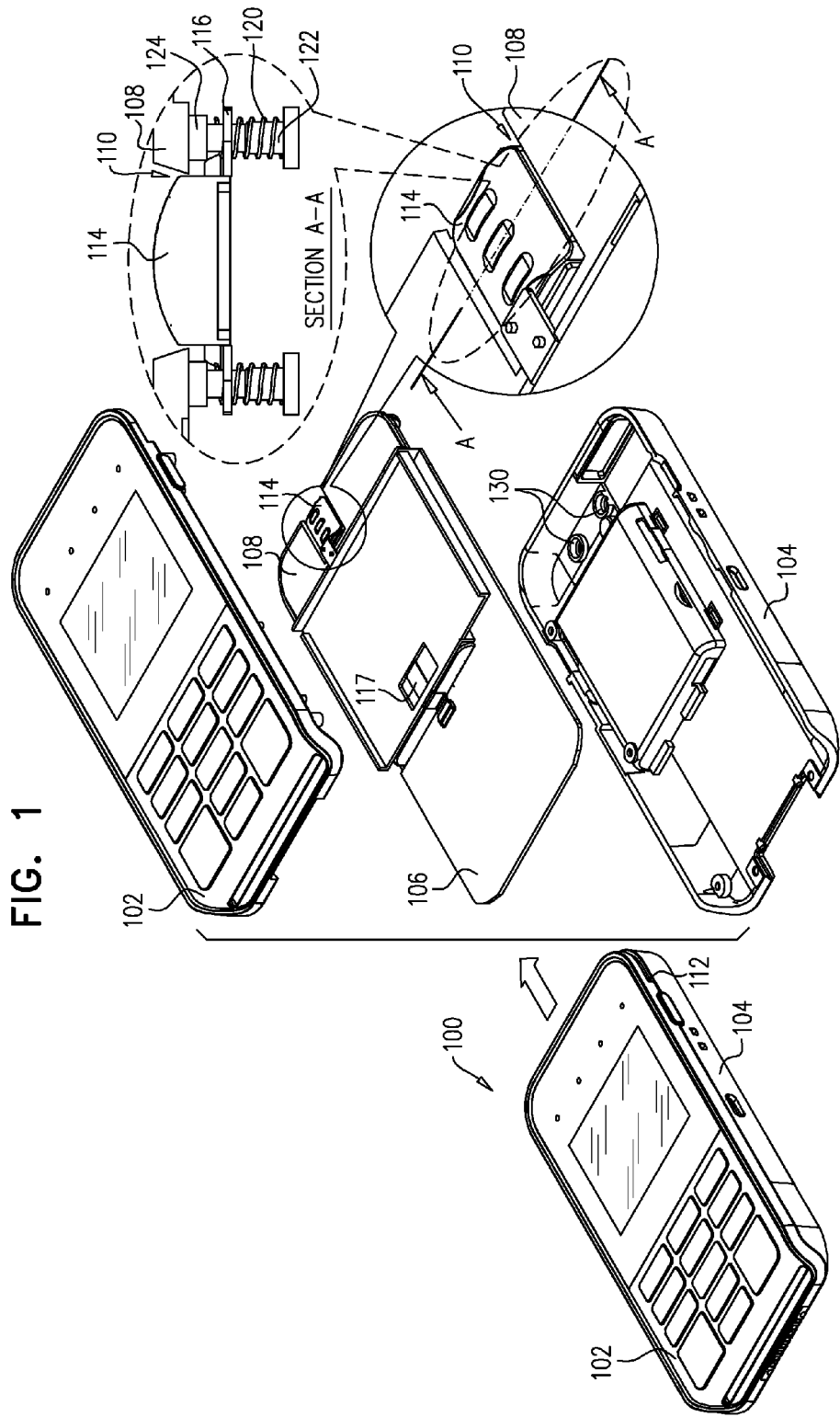
FIG. 1 is a simplified illustration of a card reader constructed and operative in accordance with one preferred embodiment of the present invention.

Reference is now made to FIGS. 1, 2A & 2B, which are simplified illustrations of a card reader 100 constructed and operative in accordance with one preferred embodiment of the present invention. As seen in FIGS. 1, 2A and 2B, the card reader 100 comprises a housing, preferably including a top portion 102 and a bottom portion 104. Disposed within the housing, inter alia, is a main board 106 and a magnetic stripe reader head support base 108 having an aperture 110 communicating with a card swipe slot 112. A magnetic stripe reader head 114 extends partially through aperture 110 into slot 112.

In accordance with a preferred embodiment of the present invention, magnetic reader head 114 is mounted onto a magnetic stripe reader head bracket 116. Magnetic reader head 114 is coupled to a flexible flat cable 117, which operatively connects it to circuitry (not shown) preferably mounted on main board 106. Bracket 116 preferably is formed with mounting apertures 118, which are preferably mutually spaced by no more than approximately 16 mm, enabling the width of bracket 116 to be as small as approximately 20 mm. Bracket 116 is, in turn, mounted onto base 108 in a manner which permits resilient generally axial retraction of the magnetic stripe reader head 114 in aperture 110 with respect to slot 112.

It is a particular feature of an embodiment of the present invention that this retractable mounting of the magnetic stripe reader head 114 is provided by a pair of coil springs 120 which are located with respect to base 108 preferably by pins 122, about which coil springs 120 are generally centered. Pins 122 are preferably attached to base 108 via protruding sockets 124.

Pins 122 are preferably provided with first and second shoulders 126 and 128. Shoulders 126 preferably limit the extent that pins 122 penetrate sockets 124 and shoulders 128 preferably limit the retraction travel of the bracket 116 and thus of the magnetic strip reader head 114 relative to the pins 122 and thus relative to the slot 112 and aperture 110. This limitation is achieved by sizing mounting apertures 118 to be sufficiently small as not to be able to pass shoulders 128 of pins 122, which thus define stops for the retraction displacement of bracket 116 against the urging of coil springs 120.

A pair of pin head engagement sockets 130 formed on lower housing portion 104 preferably engage heads of pins 122 for retaining them in full penetration engagement with sockets 124.

Optionally, a pair of pin head engagement sockets formed on an additional plate may engage heads of pins 122 for retaining them in full penetration engagement with sockets 124. As a further option, the pin head engagement sockets may be obviated.

Figure 3A:
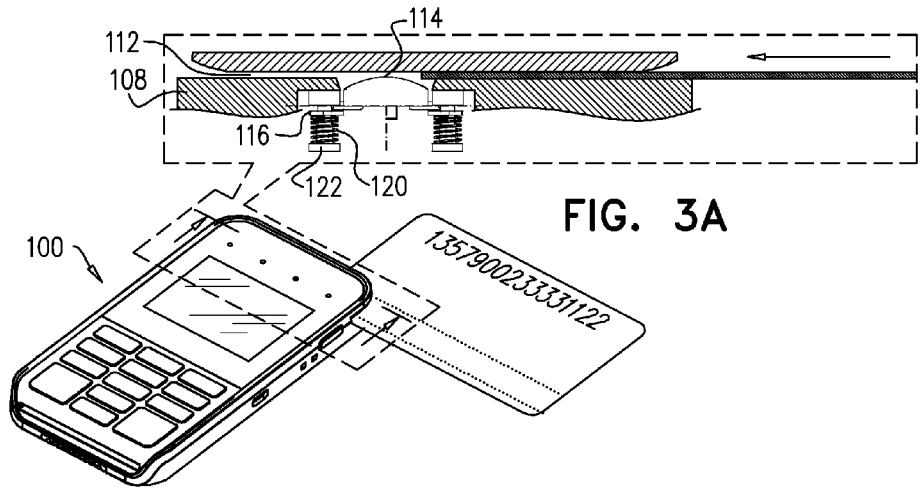
FIGS. 3A, 3B and 3C are simplified illustrations of the card reader of FIGS. 1, 2A & 2B in three operative orientations, when a card is not engaged with the card reader, when a card initially engages the magnetic strip reading head and when a card is engaged in magnetic stripe card reading engagement with the card reader.
Figure 3B:
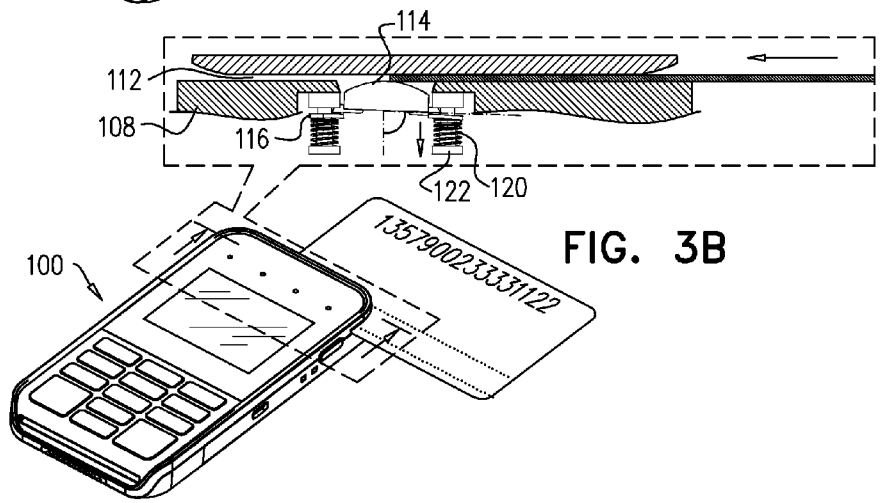
Figure 3C:
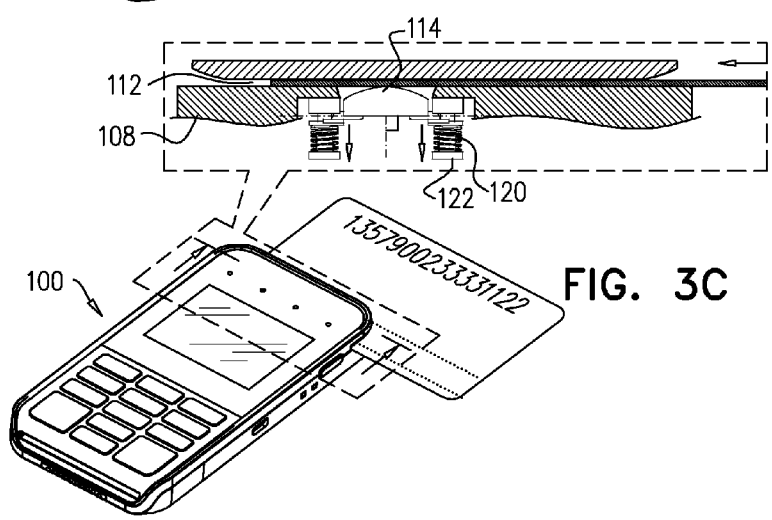

Reference is now made to FIGS. 3A, 3B & 3C, which are simplified illustrations of the card reader of FIGS. 1, 2A & 2B in three operative orientations, when a card is not engaged with the card reader 100, when a card initially engages the magnetic stripe reading head 114 and when a card is engaged in magnetic stripe card reading engagement with the card reader 100, respectively. As seen by comparing FIGS. 3A and 3B, initial insertion of a payment card into slot 112 and engagement of a leading edge of the payment card with the magnetic stripe reading head 114 causes initial skewed displacement of the magnetic stripe reading head 114 against the urging of one of springs 120, as seen in FIG. 3B.

Once the leading edge of the payment card passes the highest portion of the magnetic stripe reading head 114, as seen in FIG. 3C, the magnetic stripe reading head 114 is further displaced against the urging of the other of springs 120 and is no longer skewed but is displaced downward with respect to slot 112, as compared with its orientation in the absence of card engagement, as seen in FIG. 3A.

In a preferred embodiment of the present invention, each of springs 120 exerts a force of approximately 0.6 Newtons onto bracket 116 in the absence of a card in slot 112. During card swipe, when a magnetic stripe card is in operative engagement with the magnetic stripe reading head 114, the force exerted by each of springs 120 increases to about 0.75 Newtons, due to compression of the springs 120. Accordingly, the total force exerted by both springs 120 during card swipe is approximately 1.5 Newton, which is equivalent to approximately 150 grams.

It will be appreciated by persons skilled in the art that the present invention is not limited by what has been particularly claimed and includes both combinations and subcombinations of features described and shown hereinabove as well as modifications thereof which are not in the prior art.

The invention claimed is:

1. A magnetic stripe card reader comprising:
    a magnetic stripe reader head support base having an aperture communicating with a card swipe slot;
    a magnetic stripe reader head;
    a magnetic stripe reader head bracket supporting said magnetic stripe reader head at least partially in said aperture; and
    a pair of coil springs associated with said magnetic stripe reader head bracket and said magnetic stripe reader head support base and arranged such that resilient axial retraction of said magnetic stripe reader head in said aperture is permitted with respect to said card swipe slot,
    said magnetic stripe reader head bracket being formed with a pair of mutually spaced mounting apertures; and
    a pair of elongate fasteners extend respectively through said pair of coil springs and through said pair of mutually spaced mounting apertures into fixed engagement with said magnetic stripe reader head support base.

2. A magnetic stripe card reader according to claim 1 and wherein each of said pair of elongate fasteners is formed with a shoulder which limits an extent that said fasteners extend beyond said magnetic stripe reader head support base.

3. A magnetic stripe card reader according to claim 1 and wherein each of said pair of elongate fasteners is formed with a shoulder which limits retraction travel of said magnetic stripe reader head bracket and thus of said magnetic stripe reader head relative to said pair of fasteners and thus relative to said card swipe slot and said aperture.

4. A magnetic stripe card reader according to claim 3 and wherein said pair of mutually spaced mounting apertures are sufficiently small as not to be able to pass said shoulders, whereby said shoulders define stops for limiting retraction displacement of said magnetic stripe reader head bracket against urging of said coil springs.

5. A magnetic stripe card reader according to claim 1 and wherein each of said pair of elongate fasteners is formed with a first shoulder, which limits an extent that said fasteners extend beyond said magnetic stripe reader head support base, and a second shoulder, which limits retraction travel of said magnetic stripe reader head bracket and thus of said magnetic stripe reader head relative to said pair of fasteners and thus relative to said card swipe slot and said aperture.

6. A magnetic stripe card reader according to claim 5 and wherein said pair of mutually spaced mounting apertures are sufficiently small as not to be able to pass said second shoulders, whereby said second shoulders define stops for limiting retraction displacement of said magnetic stripe reader head bracket against urging of said coil springs.

7. A magnetic stripe card reader according to claim 1 and also comprising a pair of fastener head engagement sockets for engaging heads of said pair of fasteners for retaining them in desired fixed engagement with said magnetic stripe reader head support base.

* * * * *